(12) United States Patent
Hakimi et al.

(10) Patent No.: US 6,427,039 B1
(45) Date of Patent: Jul. 30, 2002

(54) WAVELENGTH SHIFTING AND OPTICAL SWITCHING

(75) Inventors: Farhad Hakimi; Hosain Hakimi, both of Watertown; Katherine L. Hall, Westford, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/405,262

(22) Filed: Sep. 23, 1999

Related U.S. Application Data

(63) Continuation-in-part of application No. 09/282,880, filed on Mar. 31, 1999.
(60) Provisional application No. 60/117,146, filed on Jan. 25, 1999, provisional application No. 60/126,730, filed on Mar. 29, 1999, and provisional application No. 60/143,010, filed on Jul. 9, 1999.

(51) Int. Cl.$^7$ ................................................ G02B 6/26
(52) U.S. Cl. ......................................................... 385/24
(58) Field of Search ................................ 385/35, 37, 39, 385/43, 12, 147, 15; 359/188, 290

(56) References Cited

U.S. PATENT DOCUMENTS

| | | | | |
|---|---|---|---|---|
| 5,982,963 A | * | 11/1999 | Feng et al. | ................ 385/37 |
| 6,025,915 A | * | 2/2000 | Michal et al. | ............... 356/350 |
| 6,215,927 B1 | * | 4/2001 | Singh | ....................... 385/37 |

OTHER PUBLICATIONS

"Interferometric All–optical switches for Ulrafast signal processing" by Patel et al, APplied Optics, vol. No. 14, May 10, 1998, pp. 2831–2842.*
"Dense Wavelength Division Multiplexer," Lucent Technologies company brochure/performance specifications, Bell Labs Innovations, Copyright 1997, 2 pages.

"New 3–Port/4–Port Optical Circulator," Jay Van Delden, Photonics Spectra, Jan. 1992, Laurin Publishing Co., Inc., 2 pages.

"Nonlinear Loop Mirror Devices and Applications," K.J. Blow et al., BT Technol J, vol. 11, No. 2, Apr. 1993, pp. 99–107.

"Interferometric All–Opitcal Switches for Ultrafast Signal Processing," Naimish S. Patel et al., Applied Optics, vol. 37, No. 14, May 10, 1998, pp. 2831–2842.

"Devices for Wavelength–Division Multiplexing (WDM)," Fiber Optics Handbook, pp. 3.63–3.79.

"Recent Progess in Silica–Based Planar Lightwave Circuits on Silicon," M. Kawachi, IEE Proc.–Optoelectron, vol. 143, No. 5, Oct. 1996, 257–262.

"Waveguide Array Wavelength Router Design to Improve Insertion Loss Uniformity," Hideaki Okayama et al. Optical Review, vol. 4, No. 5, 1997, pp. 543–545.

"Applications of the Integrated Waveguide Grating Router," B. Glance, Journal of Lightwave Technology, vol. 12, No. 6, Jun. 1994, 957–962.

(List continued on next page.)

*Primary Examiner*—Akm E. Ullah
(74) *Attorney, Agent, or Firm*—Fish & Richardson P.C.

(57) ABSTRACT

A method produces a wavelength shift into an optical signal. The method includes producing a coherent temporal array of optical signals (CTAS) from an incoming optical signal and broadening the signals of the CTAS to produce a interference pattern. The broadening results from transmitting the CTAS or the incoming optical signal through a dispersive medium. The method also includes selectively transmitting a peak of the interference pattern. The transmitted peak has a selected wavelength shift with respect to the incoming optical signal.

20 Claims, 6 Drawing Sheets

OTHER PUBLICATIONS

"Space–Switching 2.5 Gbit/s Signals Using Wavelength Conversion and Phased Array Routing," L.H. Spiekman et al., Electronics Letters, vol. 32, No. 4, Feb. 15, 1996, pp. 377–379.

"Fibre Dispersion or Pulse Spectrum Measurement Using a Sampling Oscilloscope," Y.C. Tong et al., Electronics Letters, vol. 33, No. 11, May, 22, 1997, pp. 983–985.

"Real–Time Fourier Transformation In Dispersive Optical Fibers," Tomasz Jannson, Optics Letters, vol. 8, No. 4, Apr. 1983, pp. 232–234.

"Dense Wavelength Division Multiplexer," 1X16 and 1Z32 DWDM's with Integral Thermal Management System, Lucent Technologies Advertisement (1997), 2 pages.

"Dense Wavelength Division Multiplexing Networks: Principles and Applications," C. A. Bracket, IEEE Journal on Selected Areas in Communications, vol. 8, No. 6, Aug. 1990, pp. 948–964.

* cited by examiner

US 6,427,039 B1

WAVELENGTH SHIFTING AND OPTICAL SWITCHING

This application is a continuation-in-part of application Ser. No. 09/282,880, filed Mar. 31, 1999, which claims the benefit of U.S. Provisional Application No. 60/117,146, filed Jan. 25, 1999.

This application claims the benefit of U.S. Provisional Application No. 60/126,730, filed Mar. 29, 1999, and U.S. Provisional Application No. 60/143,010, filed Jul. 9, 1999.

The U.S. Government has non-exclusive rights in this invention pursuant to contract number F19628-95-C-0002 awarded by DARPA and AF.

BACKGROUND OF THE INVENTION

This invention relates to optical devices and networks.

Future networks for broadband communications will need higher bandwidths for data transmission. One avenue to obtaining higher bandwidth entails using wavelength division multiplexed (WDM) optical networks. A WDM optical network can simultaneously transmit several optical signals in a single optical fiber. The simultaneously transmitted optical signals have different wavelengths, and WDM receivers selectively accept signals based on their wavelength.

Some optical networks are also dynamically reconfigurable so that transmission routes can be rapidly changed. Dynamic reconfigurability can be achieved using programmable optical add/drop multiplexers (OADM's) and optical cross connects (OXC's). OADM's add optical signals to and drop optical signals from trunk optical fibers. OXC's switch optical signals between different trunk fibers. Contemporary OXC's and OADM's can switch optical signals transparently. OXC's and OADM's using thermal control signals can transparently switch routes of optical signal at frequencies of about 2 kilo Hertz (Khz).

Herein, a transparent process is defined to be a process that changes a property or routing of an optical signal without an intermediate conversion of the optical signal into an electrical signal.

Other features and advantages of the invention will be apparent from the following description and claims.

SUMMARY OF THE INVENTION

In one aspect, the invention features a method of producing a wavelength shift into an optical signal. The method includes transparently producing a coherent temporal array of signals (CTAS) from the incoming optical signal and broadening the signals of the CTAS to produce an interference pattern by transmitting the CTAS through a dispersive medium. The method also includes selectively transmitting a peak of the interference pattern to an output terminal. A wavelength of a center of the transmitted peak has a selected wavelength shift with respect to a wavelength of the incoming optical signal.

In a second aspect, the invention features a method of producing a wavelength shift into an optical signal. The method includes transparently producing a coherent temporal array of signals (CTAS) from the incoming optical signal and broadening the signals of the CTAS to produce an interference pattern by transmitting the incoming optical signal through a dispersive medium. The method also includes selectively transmitting a peak of the interference pattern to an output terminal. A wavelength of a center of the transmitted peak has a selected wavelength shift with respect to a wavelength of the incoming optical signal.

In a third aspect, the invention features a method of switching optical signals in an optical network. The method includes receiving an optical signal from a first optical conduit of the network and transparently shifting a wavelength of the received optical signal. The method also includes transmitting the optical signal with the shifted wavelength to a second optical conduit of the network.

In a fourth aspect, the invention features an apparatus for routing optical pulses. The apparatus includes a variable temporal splitter (VTS) and a dispersive medium connected serially to the VTS. The VTS is capable of transparently producing a coherent temporal array of pulses (CTAP) from a received optical pulse. The dispersive medium is capable of broadening the pulses of the CTAP to form an interference pattern with a plurality of peaks. The apparatus includes a 1×M wavelength division multiplexer (WDM) coupled to receive one of the peaks.

In a fifth aspect, the invention features an optical switch. The optical switch includes a variable wavelength shifter (VWS) and a wavelength division multiplexer (WDM) coupled to receive optical pulses with shifted wavelengths from the VWS. The VWS transparently shifts a wavelength of a received optical pulse.

Various embodiments provide transparent optical multiplexers and switches with switching frequencies of between a few tens of giga Hertz to a few hundreds of giga Hertz. The optical switches can provide high speed programmable OXC and OADM's for use in reconfigurable optical networks.

DESCRIPTION OF THE PREFERRED EMBODIMENTS

Figure 1:
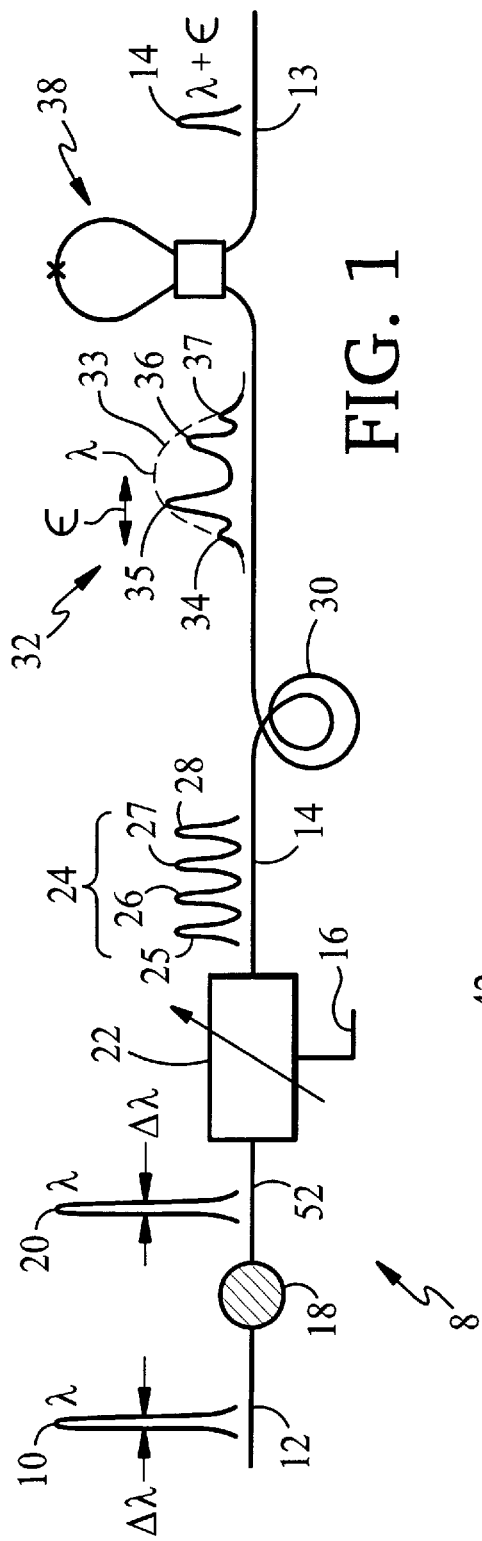
FIG. 1 shows one embodiment of a variable wavelength shifter (VWS)

FIG. 1 shows a variable wavelength shifter (VWS) 8, which receives an incoming optical signal 10 from optical fiber 12. The optical signal 10 has a peak whose center wavelength is $\lambda$ and wavelength spread is $\delta\lambda$. From incoming optical signal 10, VWS 8 transparently produces an outgoing optical signal 14 having a shifted peak (e.g., at outgoing center wavelength λ+ε) on optical fiber 13. The size of wavelength shift ε produced by VWS 8 is determined by a control signal applied to control terminal 16. Control signals can change wavelength shift ε at high frequencies, e.g., tens to hundreds of giga Hertz.

Figure 2:
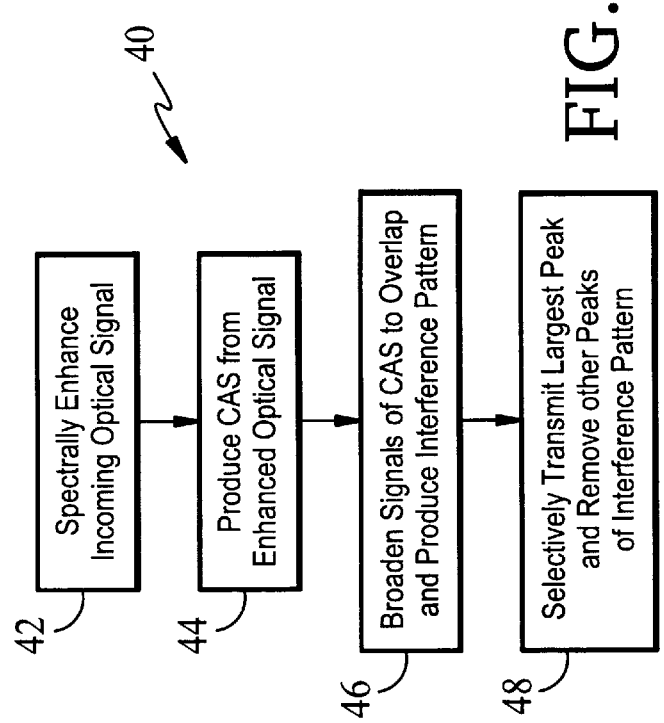
FIG. 2 is a flow chart for a method of shifting a wavelength of an optical signal with the VWS of FIG. 1.

The VWS 8 shifts the wavelength of incoming optical signal 10 according to a method 40 shown in FIG. 2. Each incoming optical signal 10 passes through a bandwidth enhancer 18 that spectrally enhances the incoming signal 10 (step 42). Bandwidth enhancer 18 improves the spectral form of received signals by filling in spectral absorption regions. Such absorption regions occur in incoming optical signal 10 because of prior processing by network elements (not shown) that absorb light in certain frequency ranges.

After enhancement, enhanced optical signal 20 enters a variable temporal splitter (VTS) 22. VTS 22 produces a coherent temporal array of signals (CTAS) 24 from optical signal 20 transparently (step 44). CTAS 22 is a temporal series of individual optical signals 25–28, which are mutually coherent. If incoming optical signal 10 is a narrow pulse, CTAS 22 is a coherent temporal array of pulses (CTAP) in which signals 25–28 are non-overlapping pulses. To form CTAS 24, VTS 22 amplitude splits the received optical signal 20 into separate optical signals, delays each separate optical signal differently, and recombines the delayed optical signals to produce CTAS 24. The delays between the signals 25–28 of the CTAS 24 are responsive to control signals applied to control terminal 16.

From VTS 22, CTAS 24 travels through a dispersive medium 30, e.g., a roll of dispersive optical fiber. Dispersive medium 30 broadens each optical signal 25–28 of CTAS 24 so that the broadened optical signals strongly spatially overlap (step 46). Due to the spatial overlap, the separate optical signals of the CTAS 24 interfere and produce an interference pattern 32.

Interference pattern 32 has an envelope 33 and a number of spatially separated peaks 34–37. Envelop 33 is the signal that dispersion would produce if enhanced optical signal 20 passed directly into dispersive medium 30 without undergoing intermediate production of CTAS 24. Dispersion produces a broader range of wavelengths in envelop 33 than the range of wavelengths in enhanced signal 20. Different spatial portions of envelope 33 correspond to different wavelengths. Since different peaks 34–37 are in different spatial portions of envelop 33, these peaks 34–37 have different wavelengths. In particular, the center of largest amplitude peak 35 has a wavelength shift ε with respect to wavelength λ of incoming signal 10, i.e., the wavelength of the center of envelop 33. Due to dispersion broadening, the shift ε of largest amplitude peak 35 may be significantly greater than the spread Δλ in enhanced optical signal 20.

Interference pattern 32 enters a nonlinear optical loop mirror (NOLM) 38, i.e., an optical amplitude discriminator. NOLM 38 selectively transmits largest amplitude peak 35 and attenuates or removes remaining peaks 34, 36, and 37 to produce outgoing optical signal 14 on optical fiber 13 (step 48). Since largest peak 35 has a wavelength λ+ε, VWS 8 has shifted the wavelength ε of incoming signal 10 by ε.

The wavelength λ+ε of outgoing optical signal 14 is determined by the temporal spacings between signals 25–28 of CTAS 24. The temporal spacings between signals 25–28 are controlled by control signals applied to control terminal 16. The signals at control terminal 16 are selected to produce a desired value for wavelength shift ε.

Figure 3:
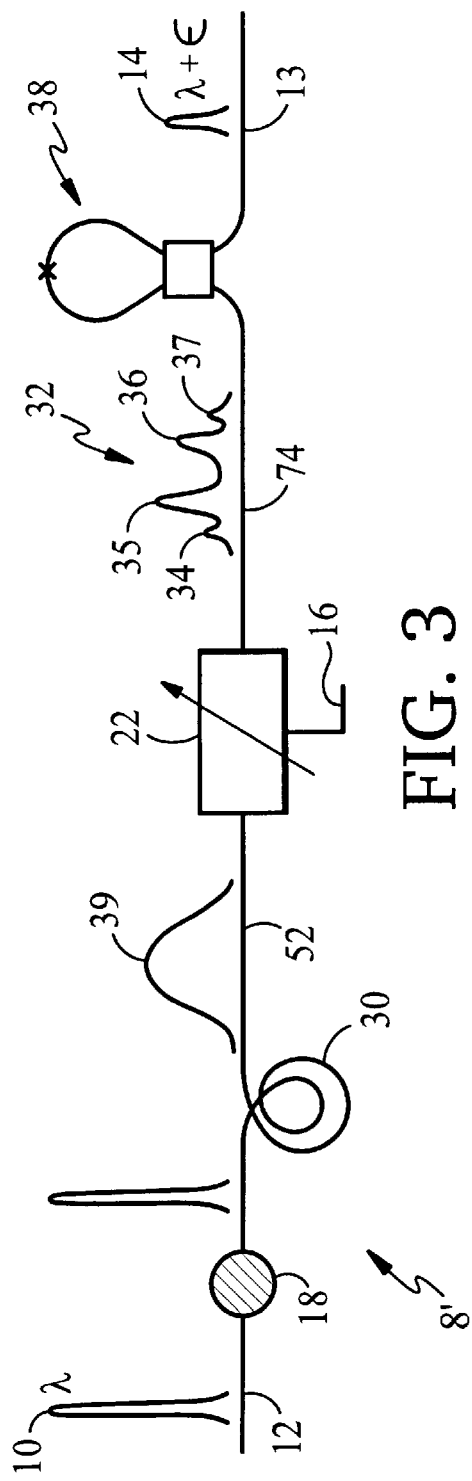
FIG. 3 shows an alternate embodiment of a variable wavelength shifter (VWS)

An alternate embodiment of a VWS 8' is shown in FIG. 3. In VWS 8', dispersive medium 30 is located earlier on the optical path of incoming signal 10 than VTS 22. Dispersion medium 30 broadens signal 20 to produce signal 39 prior to production of a CTAS by VTS 22. Since the signal 39 is spatially broad, the separate optical signals of the CTAS are broad and interfere at production of the CTAS to produce interference pattern 32. Again, sending interference pattern 32 through NOLM 38 produces outgoing optical signal 14 with shifted wavelength λ, +ε.

Figure 4:
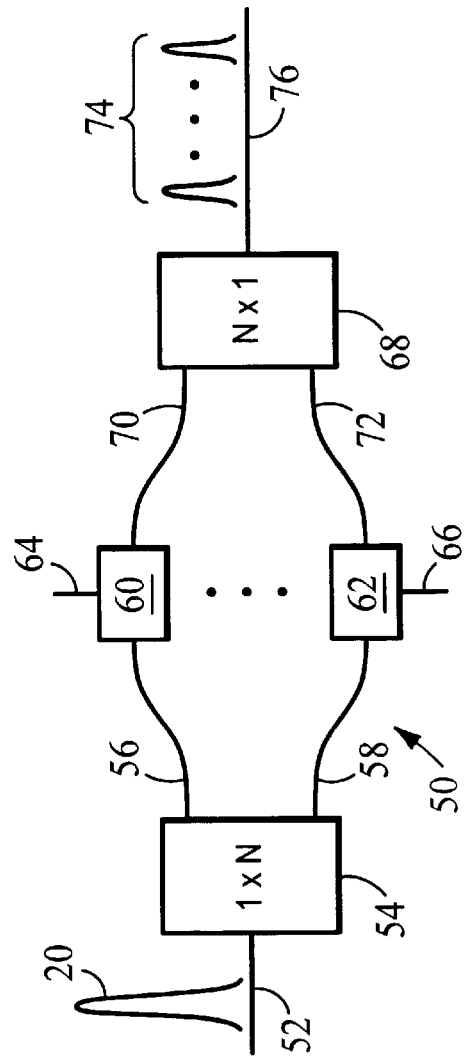
FIG. 4 shows an embodiment of a variable temporal splitter (VTS), which may be used in the VWS's of FIGS. 1 and 3.

One embodiment of a VTS 50 capable of producing CTAS's, e.g., CTAS 22 of FIGS. 1 and 3, from incoming optical signal 20 is shown in FIG. 4. VTS 50 receives incoming optical signal 20 from optical fiber 52, which connects to an input terminal of a 1×N optical fiber coupler 54. Optical fiber coupler 54 amplitude splits received optical signal 20 into N mutually coherent optical signals and directs each signal into a different optical conduit 56 to 58. The optical conduits 56 to 58 may be single mode optical fibers. Each optical conduit 56 to 58 includes a variable path element 60 to 62, which serially connects to the fiber. The variable path elements 60 to 62 have optical path lengths that depend on values of signals received at control terminals 64 to 66. The individual control terminals connect to control terminal 16 of FIGS. 1 and 3. The variable path elements 60 to 62 also connect to an N×1 optical coupler 68 via optical conduits 70 to 72, e.g., single mode optical fibers. Optical coupler 68 combines delayed optical signals received from the optical conduits 70 to 72 to produce CTAS 74 on outgoing optical fiber 76.

The variable path elements 60 to 62 of FIG. 4 are either electrically or optically controlled.

Figure 5:
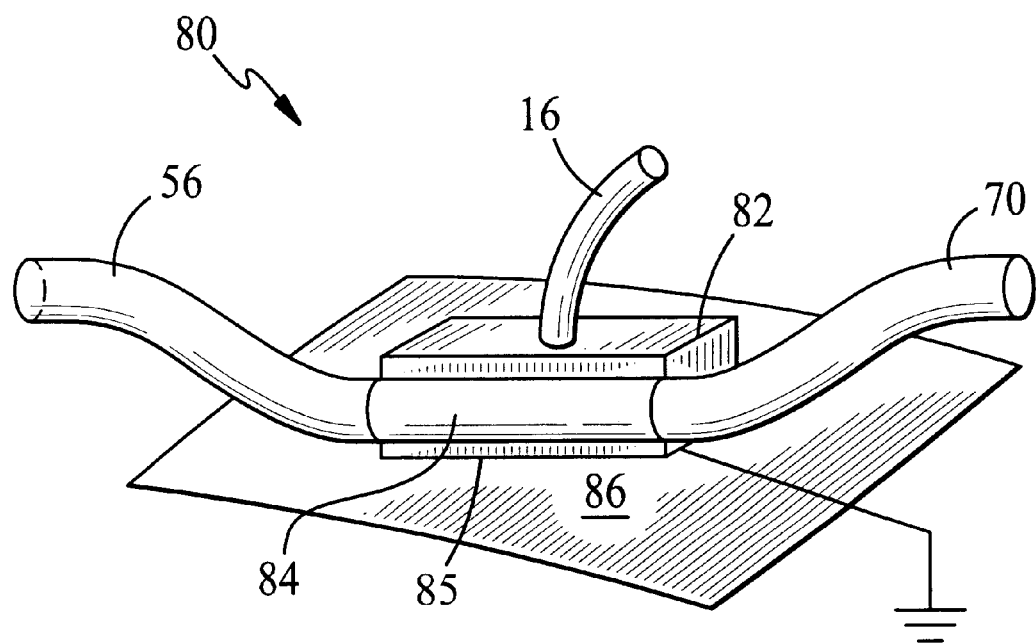
FIG. 5 shows an electrically controlled variable path element, which may be used in the VTS of FIG. 4.

Variable path elements 60 to 62 may be implemented as electrically controlled path element 80 shown in FIG. 5. In path element 80, an optical conduit 84 connects incoming and outgoing optical fibers 56 and 70. A portion of a top surface of optical conduit 84 is covered by a metal layer 82, which connects electrically to control terminal 16. Optical conduit 84 rests on a conductive layer 85 located in a portion of a substrate 86. Metal layer 82 and conductive layer 85 form a capacitive device.

The optical conduit 84 is constructed of a material, e.g., lithium niobate, whose index of refraction depends on the voltage applied across the conduit 84. During operation, a control voltage is applied to the metal layer 82 via control terminal 16, and conductive layer 85 is grounded. The size of the applied voltage determines the index of refraction of optical conduit 84. Thus, optical conduit 84 delays an optical signal from optical fiber 56 to optical fiber 70 by a time characterized by the voltage applied to control terminal 16.

The speed at which the index of refraction of optical conduit 84 responds to applied voltages determines the maximum switching frequency for a VWS, e.g., VWS 8 or 8', using variable path element 80. The maximum switching frequency is about 50 giga Hertz if the optical conduit 84 is constructed with lithium niobate.

Figure 6:
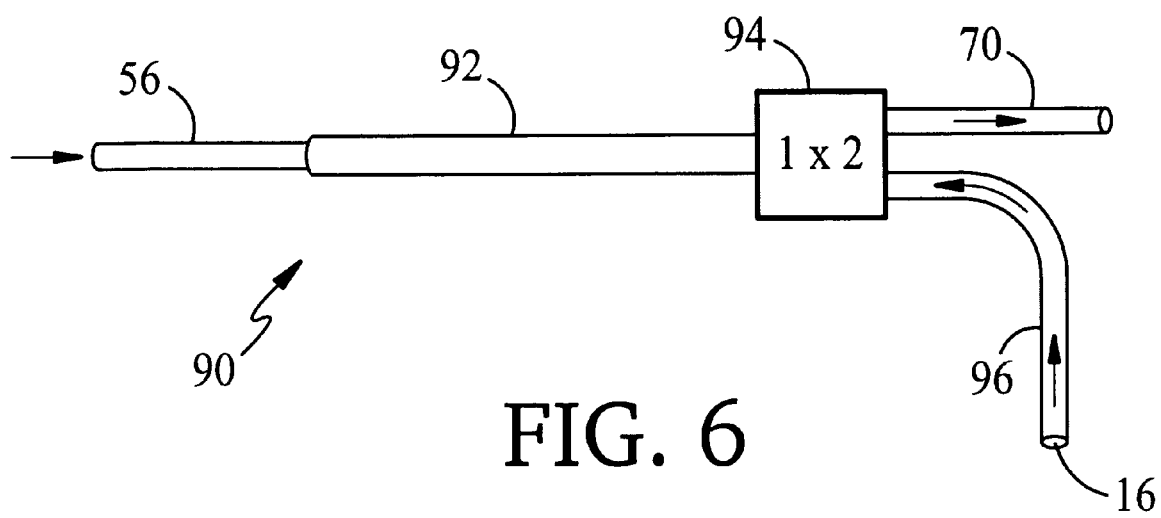
FIG. 6 shows an optically controlled variable path element, which may be used in the VTS of FIG. 4.

The variable path elements 60 to 62 of FIG. 4 may also be implemented as an optically controlled element 90 shown in FIG. 6. Element 90 includes a nonlinear optical media 92 having an index of refraction that depends on the total light intensity in the media 92. Nonlinear media 92 transmits optical signals from optical fiber 56 to a 1×2 optical fiber coupler 94. Coupler 94 transmits optical signals received from nonlinear medium 92 to outgoing optical fiber 70. The optical signal on outgoing optical fiber 70 has a delay, which is determined by the index of refraction of nonlinear medium 92.

The index of refraction of nonlinear material 92 is changed by control optical signals introduced into media 92 through an optical fiber 96, i.e., control terminal 16 of FIG. 4. Optical coupler 94 transmits the control optical signals from fiber 96 into nonlinear media 92 without substantially contaminating outgoing optical fiber 70. Fiber 70 is not contaminated by control optical signals, because control and incoming optical signals propagate in opposite directions in the nonlinear mater 92. Control optical signals adjust the total light intensity in nonlinear material 92 producing an index of refraction therein that provides desired delays for optical signals traveling from fiber 56 to fiber 70.

Other embodiments for VTS's will be known to persons of ordinary skill in the art in light of the above disclosure and U.S. application Ser. No. 60/126,730, titled "Fast Variable Optical Delay", filed Mar. 29, 1999 by Katherine L. Hall et al, which is incorporated by reference, and U.S. application Ser. No. 09/282,880.

Figure 7:
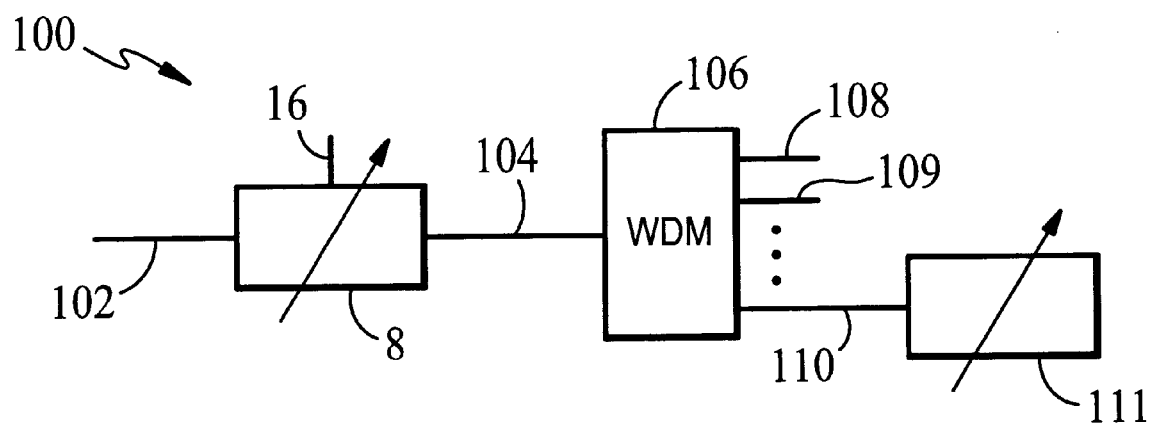
FIG. 7 shows an optical multiplexer that uses a wavelength shifting to multiplex optical signals.

VWS 8 can be used to construct a 1×N optical multiplexer 100 shown in FIG. 7. Optical multiplexer 100 receives incoming optical signals from an optical fiber 102 that connects to an input terminal of VWS 8. VWS 8 shifts the wavelength of the incoming optical signal and transmits the optical signal with a shifted wavelength to an optical fiber 104. Optical fiber 104 carries the optical signal with a shifted wavelength to a WDM 106 that routes the optical signal to an output optical fiber 108 to 110. Each output fiber 108 to 110 may include a second VWS, as show for fiber 110 by the VWS 111, to shift wavelengths of outgoing optical signals to desired values.

Figure 8:
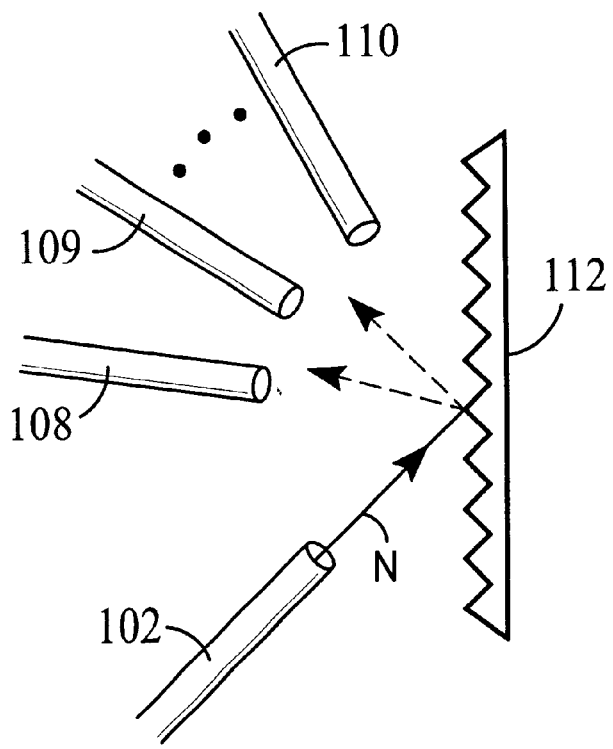
FIG. 8 shows one embodiment of a wavelength division multiplexer (WDM)

One embodiment of the WDM 106 uses an optical grating 112 shown in FIG. 8. Optical grating 112 receives optical signals from fiber 102, which is oriented along direction N, and reflects the received optical signals into fibers 108 to 110 oriented along different directions. The reflection directions depend on the wavelength of the received optical signals. By properly shifting the wavelength of optical signals received from fiber 102, VWS 8 of FIG. 7 controls the reflection direction produced by grating 112 and thus, the route selection between fibers 108 to 110.

Figure 9:
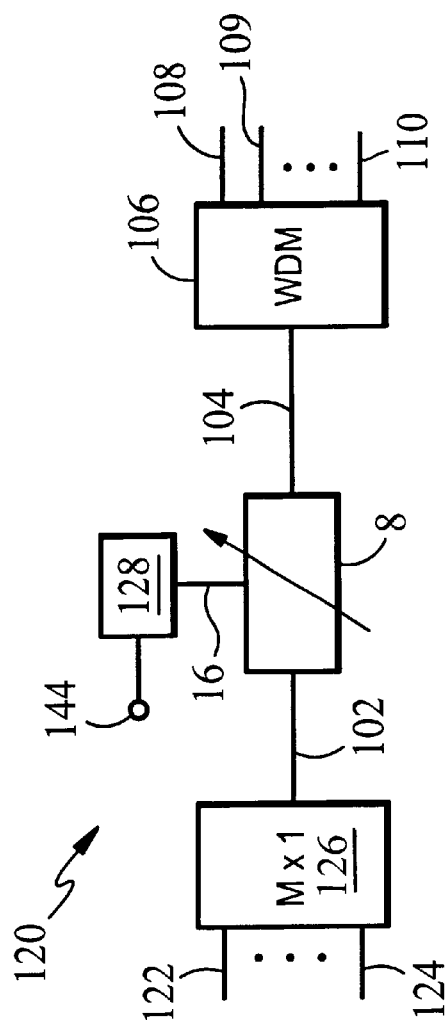
FIG. 9 shows a uni-directional switch that uses wavelength shifting to route optical signals.

VWS 8 can also be used to construct a M×N switch 120 shown in FIG. 9. MxN switch 120 receives incoming optical signals from optical fibers 122 to 124 via an M×1 optical fiber coupler 126. The optical output terminal of M×1 fiber coupler 126 connects to optical fiber 102 of the 1×N optical multiplexer 100 shown in FIG. 7.

M×N switch 120 again transparently routes incoming optical signals to selected outgoing optical fibers 108–110 by appropriately shifting the wavelengths of the incoming optical signals. The wavelength shifts are performed by VWS 8 under the control of signals received from control terminal 16. The size of wavelength shifts depends both on the wavelength of the incoming optical signal and the final routing desired. A programmable controller 128 determines the size of wavelength shifts and generates the appropriate control signal for each incoming optical signal received from fibers 122–124.

Figure 10:
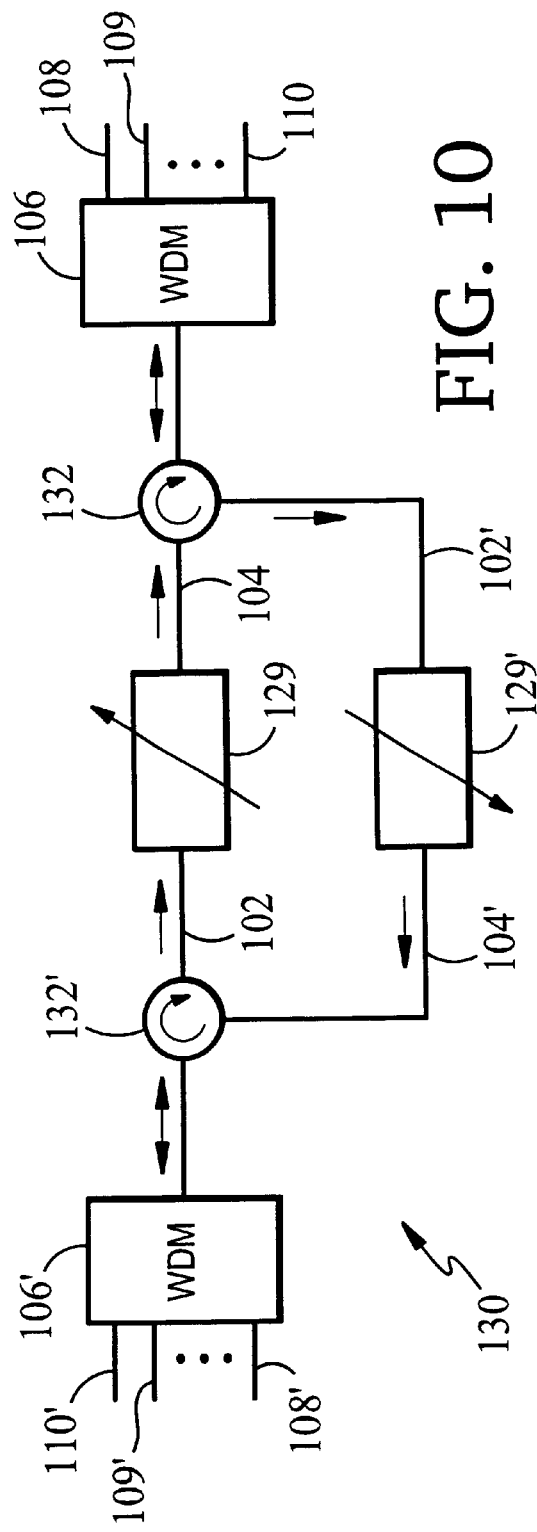
FIG. 10 shows a bi-directional switch that uses wavelength shifting to route optical signals.

Using two VWS's 129 and 129', a bi-directional optical switch 130 may be constructed as shown in FIG. 10. In the bi-directional optical switch 130, the two VWS's 129 and 129' separately route optical signals received from optical fibers 108'–110' and from optical fibers 108–110. To separately route signals received from the two sets of optical fibers 108'–110' and fibers 108–110, the switch 130 employs two optical circulators 132 and 132'.

Optical circulators 132 and 132' route optical signal received at any terminal to the nearest clockwise adjacent terminal of the same circulator 132 and 132'. Thus, first circulator 132 routes optical signals received from optical fibers 108–110 via WDM 106 to second VWS 129'. Similarly, second circulator 132' routes optical signals received from optical fibers 108'–110' via WDM 106' to first VWS 129. VWS's 129 and 129' transparently shift the wavelength of received optical signals and transmit the signals with shifted wavelengths to WDM 106' and 106, respectively, via one of the circulators 132' or 132.

Figure 11:
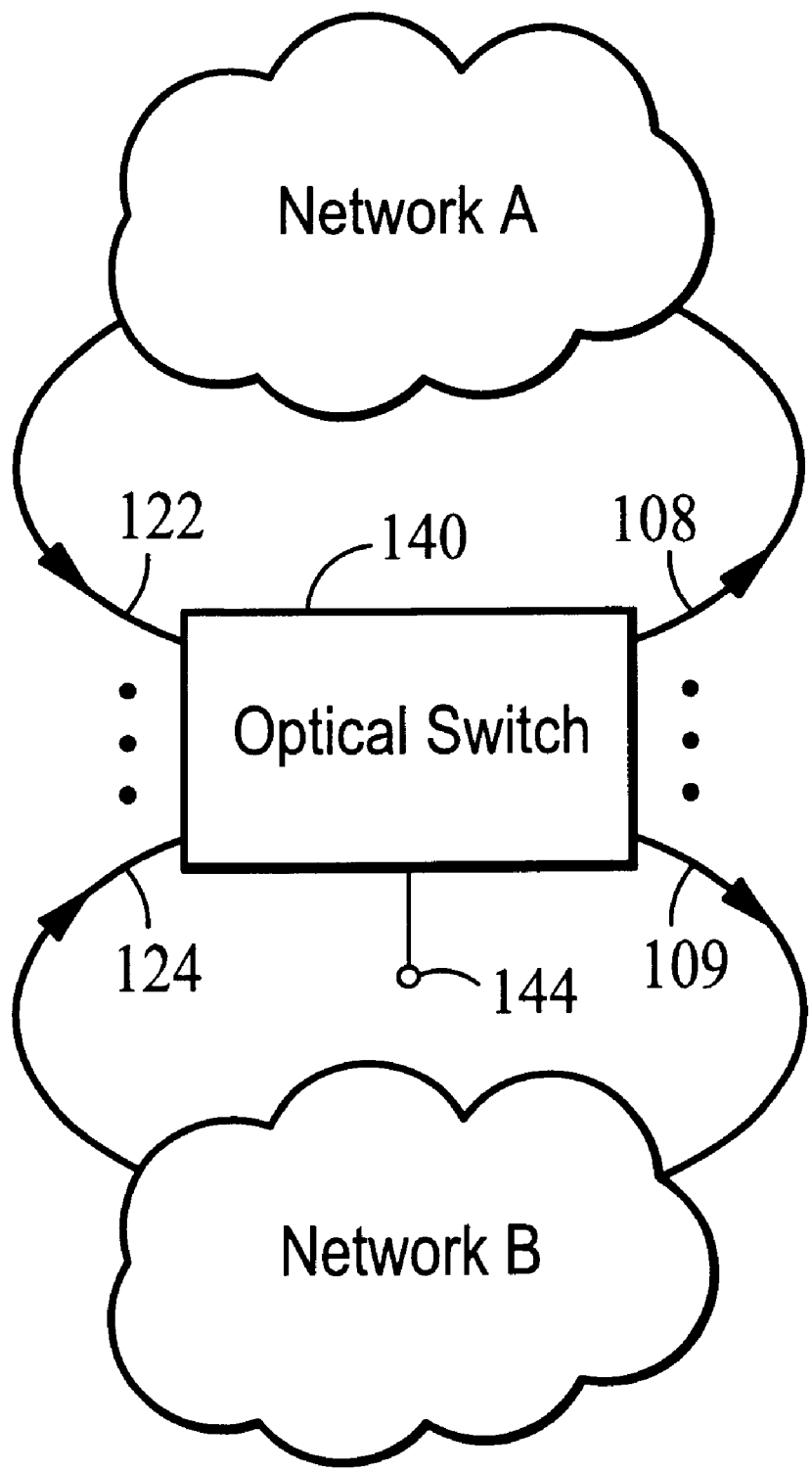
FIG. 11 shows an optical cross connect that uses wavelength shifting to transmit optical signals between different optical networks.

Using a multiple terminal optical switch, e.g., switch 120 of FIG. 9, an optical cross connect (OXC) 140 can be constructed for connecting optical networks A and B as shown in FIG. 11. OXC 140 has at least two input and two output terminals and functions by wavelength shifting as described in relation to FIGS. 3–9. Switch 140 responds to control signals received from a control terminal 144. If networks A and B carry signals of predetermined wavelength, the control signals have values for connecting A<- - - >A, B<- - - >B, A<- - - >B, and B<- - - >A, e.g., four different digital control signals.

The bi-directional optical switch 130 of FIG. 10 can also be used to make OXC 140 bi-directional by techniques that would be evident to persons of skill in the art in light of the above disclosure.

The optical switch 140 can also be used to construct optical add/drop multiplexers (OADM) having the form shown in FIG. 11. For an OADM, fibers 124 and 109 are optical conduits for transparently adding and dropping optical signals, respectively, from trunk optical fiber 122 and 108.

Other embodiments are within the scope of the following claims.

What is claimed is:

1. A method of producing a wavelength shift in an incoming optical signal, comprising:

transparently producing a coherent temporal array of optical signals (CTAS) from the incoming optical signal, the CTAS having spacings that are responsive to a control signal;

broadening the signals of the CTAS to produce an interference pattern by transmitting the CTAS through a dispersive medium; and selectively transmitting a peak of the interference pattern to an output terminal, a center wavelength of the transmitted peak having a selected wavelength shift with respect to a wavelength of the incoming optical signal.

2. The method of claim 1, wherein the act of producing comprises:

splitting the incoming optical signal into optical signals directed into separate optical conduits; and changing an index of refraction of a portion of one of the optical conduits.

3. The method of claim 2, wherein the act of producing further comprises:

applying an electrical control voltage across a portion of the one of the optical conduits; and wherein the index of refraction is responsive to the applied voltage.

4. The method of claim 2, wherein the act of producing further comprises:

transmitting a control optical signal down a portion of the one of the optical conduits; and wherein the index of refraction is responsive to light intensities in the one of the optical conduits.

5. The method of claim 1, further comprising:

producing a second CTAS from a second incoming optical signal;

broadening the signals of the second CTAS to produce a second interference pattern by transmitting the second CTAS through the dispersive medium; and selectively transmitting a peak of the second interference pattern with a second selected wavelength shift.

6. The method of claim 1, wherein the acts of producing CTAS's comprise:

splitting each incoming signal into signals directed into a separate optical conduits; and changing an index of refraction of a portion of one of the optical conduits to first and second values in splitting the first incoming optical signal and splitting the second incoming optical signal, respectively.

7. The method of claim 1, wherein the act of selectively transmitting comprises sending the interference pattern into an amplitude discriminator.

8. The method of claim 1, wherein the incoming optical signal is an incoming pulse and the array of optical signals is an array of pulses.

9. The method of claim 8, wherein the pulses in the array of pulses are non-overlapping.

10. A method of producing a wavelength shift in an incoming optical signal, comprising:

transmitting the signal through a dispersive medium that produces a broadened signal;

transparently producing a coherent temporal array of optical signals (CTAS) from the broadened signal, the signals of the CTAS to produce a interference pattern with peak positions responsive to a control signal; and selectively transmitting a peak of the interference pattern to an output terminal, a center wavelength of the transmitted peak having a selected wavelength shift with respect to a wavelength of the incoming optical signal.

11. The method of claim 10, wherein the act of producing comprises:

splitting the incoming optical signal into optical signals directed into separate optical conduits; and changing an index of refraction of a portion of one of the optical conduits.

12. The method of claim 11, wherein the act of producing further comprises:

applying an electrical control voltage across a portion of the one of the optical conduits; and wherein the index of refraction is responsive to the applied voltage.

13. The method of claim 11, wherein the act of producing further comprises:

transmitting a control optical signal down a portion of the one of the optical conduits; and wherein the index of refraction is responsive to light intensities in the one of the optical conduits.

14. The method of claim 10, further comprising:

producing a second CTAS from a second incoming optical signal;

broadening the signals of the second CTAS to produce a second interference pattern by transmitting the second incoming optical signal through the dispersive medium; and selectively transmitting a peak of the second interference pattern with a second selected wavelength shift.

15. The method of claim 10, wherein the acts of producing CTAS's comprise:

splitting each incoming signal into signals directed into a separate optical conduits; and changing an index of refraction of a portion of one of the optical conduits to first and second values in splitting the first incoming optical signal and splitting the second incoming optical signal, respectively.

16. The method of claim 10, wherein the act of selectively transmitting comprises sending the interference pattern into an amplitude discriminator.

17. The method of claim 10, wherein the incoming optical signal is an incoming pulse and the array of optical signals is an array of pulses.

18. The method of claim 17, wherein the pulses in the array of pulses are non-overlapping.

19. A method of producing a wavelength shift in an incoming optical pulse that is characterized by a given wavelength, said method comprising:

producing a plurality of optical pulses from the incoming optical pulse, each of the pulses of the plurality of optical pulses having the same shape as the incoming pulse;

using a control signal to control a timing of the pulses of the plurality of optical pulses relative to each other;

combining the plurality of optical pulses to produce a coherent temporal array of optical pulses;

transmitting the temporal array of optical pulses through a dispersive medium and thereby causing the pulses of the temporal array of pulses to broaden and interfere with each other to produce an interference pattern having one or more peaks located at positions which are controlled by the control signal; and selectively transmitting one of the one or more peaks of the interference pattern to an output terminal, a center wavelength of the transmitted peak having a selected wavelength shift with respect to the wavelength of the incoming optical pulse.

20. A method of producing a wavelength shift in an incoming optical pulse, said method comprising:

transmitting the optical pulse through a dispersive medium to produce a broadened optical pulse;

producing a plurality of broadened optical pulses from the first-mentioned broadened optical pulse, each of the pulses of the plurality of broadened optical pulses having the same shape as the first-mentioned broadened optical pulse;

using a control signal to control a timing of the pulses of the array of broadened optical pulses relative to each other;

combining the array of broadened optical pulses to produce a coherent temporal array of optical pulses, the coherent temporal array of optical pulses interfering with each other to produce an interference pattern with peak positions responsive to the control signal; and selectively transmitting a peak of the interference pattern to an output terminal, a center wavelength of the transmitted peak having a selected wavelength shift with respect to the wavelength of the incoming optical pulse.

* * * * *